(12) United States Patent
Harju

(10) Patent No.: US 8,511,204 B2
(45) Date of Patent: Aug. 20, 2013

(54) TRANSMISSION ARRANGEMENT

(75) Inventor: Bert Harju, Harads (SE)

(73) Assignee: Harju Linearwandler AB, Sjobo (SE)

( * ) Notice: Subject to any disclaimer, the term of this patent is extended or adjusted under 35 U.S.C. 154(b) by 1340 days.

(21) Appl. No.: 12/063,777

(22) PCT Filed: Aug. 16, 2006

(86) PCT No.: PCT/SE2006/000948
§ 371 (c)(1),
(2), (4) Date: Jul. 18, 2008

(87) PCT Pub. No.: WO2007/021232
PCT Pub. Date: Feb. 22, 2007

(65) Prior Publication Data
US 2009/0272209 A1 Nov. 5, 2009

(30) Foreign Application Priority Data
Aug. 17, 2005 (SE) ...................................... 0501828

(51) Int. Cl.
*F16H 37/06* (2006.01)
(52) U.S. Cl.
USPC ........................................................ 74/665 A
(58) Field of Classification Search
None
See application file for complete search history.

(56) References Cited

U.S. PATENT DOCUMENTS 2,566,601 A * 9/1951 Cousins ........................ 475/246
5,136,888 A 8/1992 Nix

FOREIGN PATENT DOCUMENTS

DE 3734913 A1 5/1989
DE 19842473 A1 8/1999

OTHER PUBLICATIONS

PCT International Search Report for PCT/SE2006/000948 mailed on Nov. 8, 2006.

* cited by examiner

*Primary Examiner* — David D Le
*Assistant Examiner* — Erin D Bishop
(74) *Attorney, Agent, or Firm* — Ladas & Parry LLP

(57) ABSTRACT

A transmission arrangement includes a first prime motor arrangement having a first gear shaft and a first gear wheel; and a second prime motor arrangement having a second gear shaft, and a second gear wheel. Where a first gear wheel arrangement includes the first gear wheel and is integrally formed with a first bevel gear wheel; the second gear wheel is integrally formed with a second bevel gear wheel; and a third bevel gear wheel is adapted to mesh with the first and second bevel gear wheels. The first bevel gear wheel, and second bevel gear wheel are fixed to the first and second gear shafts via their respective freewheel bearings; and both first and second gear shafts are sections of a single gear shaft. The gear shaft is supported in a first pivotal direction and fixedly supported in a second pivotal direction.

8 Claims, 4 Drawing Sheets

TRANSMISSION ARRANGEMENT

This application is a national stage filing under 35 U.S.C. §371 of International Application No. PCT/SE2006/000948 filed on 16 Aug. 2006. This International Application claims priority to Swedish Patent Application No. 0501828-8, filed on 17 Aug. 2005. These applications are incorporated herein by reference.

FIELD OF INVENTION

The present invention relates to a transmission arrangement in general, to a transmission arrangement, and more specifically to such a transmission arrangement that might translate a reciprocating translation movement, related to a gear rod or more specifically each of two gear rods, where said gear rod or gear rods are in mesh with or in engagement with its allotted rim wheel or gear wheel, for turning or rotating said gear wheel in dependence of the direction of said translation movement, where a first gear rod and its associated first gear wheel is representing a first prime mover or motor arrangement, while a second gear rod and its associated second gear wheel is representing a second prime mover or motor arrangement, for causing a rotational movement of a shaft in one and the same rotational direction.

It is obvious that an arrangement including a reciprocating translation movement of one or more gear rods in engagement with its gear wheel for rotating said gear wheel may be used without said gear rod, if other means are involved for rotating said gear wheel in only one or alternatively in both directions.

The gearwheels, according to the present invention, have each a hollow cylindrical shape in order to freely surround one and the same shaft at different locations thereof.

Said first gear wheel and said second gear wheel are concentrically arranged to and around said shaft, and each of these gear wheels is related to said shaft via its related freewheel bearing.

A gear wheel arrangement, including three bevel gear wheels, is adapted to expose a first bevel gear wheel in cooperation with said first gear wheel, a second bevel gear wheel in cooperation with said second gear wheel and a third bevel gear wheel, adapted to mesh with or be engaged with said first and second bevel gear wheels, in order to adapt or to cause these two bevel gear wheels to rotate in different rotational directions.

BACKGROUND OF INVENTION

Methods, arrangements and constructions relating to the above-disclosed technical field and nature are previously known in numerous different em-bodiments in the art.

Thus, it might initially be mentioned that different arrangements are previously known in the art for causing a first pivotal movement or a first rotational movement to be allocated to a first shaft and to transmit said rotational movements to a second shaft by the intermediary of one or more bevel gears and/or gear wheel arrangements.

Transmission arrangements are also previously known in the art where a pivotal movement may be transmitted by the intermediary of a first freewheel bearing and/or a second freewheel bearing.

Said prior art arrangements, which do relate to a rotational converter, where a rotational direction for an input shaft can, by the intermediary of gear wheels associated with the shaft, be transmitted to an output shaft as a corres-ponding movement or a counter-directed movement, depending upon a selected position of adjustment for an axially reciprocal shift fork.

Thus, such a prior art rotational converter will transfer an input rotation and force in a first direction of rotation to a desired direction of rotation on an output shaft, or vice versa.

More particularly, it is a question of, when said shift fork is located in a retracted position, a clockwise direction of rotation of the input shaft will be converted into a counter-clockwise direction of rotation for the output shaft, and when the shift fork is in a protracted position, a clockwise direction of rotation of the input shaft will be converted into a clockwise-related direction of rotation of the output shaft, and vice versa.

It is also previously known in the art to utilise, in a rotational converter of the above-disclosed nature, a so-called pendulum movement, where a translation movement or linear movement for a piston, included in a piston and cy-under assembly, delivers a first rotational movement to the input shaft and, by actuating the shift fork in response to the movement of the piston and cylinder assembly, by utilising freewheel couplings, such a reciprocating movement of the input shaft can be transformed into a rotational movement of the output shaft.

It is also previously known in the patent publication number EP-A1-0 510 916 a mechanism (10) for converting oscillatory rotations of an input shaft (12) to a unidirectional rotation of an output shaft (14).

This mechanism (10) makes use of two bevel gears (40, 42) that are mounted around the input shaft (12) and a third bevel gear (44) intermeshed therewith and coupled to the output shaft (14).

Each bevel gear (40, 42) mounted around the input shaft (12) can be alterna-tely coupled to and uncoupled from the input shaft (12) via an associate pawl construction (80, 90), disposed in a socket (72, 74) in the input shaft (12) and biased towards an operative position, wherein each pawl construction (80, 90) is extended into a single recess (50, 58) in a bearing surface of such bevel gear.

The oscillatory rotation of said input shaft (12) is here limited to a range of approximately 180° between two limiting positions, defined by an engagement of a stud (28), movable with a handle against a pair of adjustable studs (30, 32).

The surfaces (100, 102; 110, 112) on the pawl constructions and the gears provide for the movement of each pawl section from its operative position.

SUMMARY OF INVENTION

Taking into account the circumstance that the technical considerations which a person skilled in the art must carry out to be able to offer a solution to one or more technical problems there requires, on the one hand, initially a necessary insight into the measures and/or the sequence of measures to be implemented and, on the other hand, a necessary selection of the means required, in view hereof, the following technical problems are likely to be relevant in the evolution of and in the development of the present invention. Under consideration of the state of the art, as described above, it should therefore probably be seen as a technical problem to be able to realize the importance of, the advantages associated with and/or the technical measures and considerations which will be required in order, in a transmission arrangement of the type disclosed to facilitate the constructional efforts of forming each separate part thereof and to integrate, as far as possible, required and used parts and to reduce the assembly efforts of such an arrangement compared the teachings exposed in the above mentioned EP patent application.

There resides a technical problem in being able to realize the importance of, the advantages associated with and/or the technical measures and considerations which will be required in order to cause said first bevel gear wheel and its associated first gear wheel, related to a first prime mover or motor arrangement, to be integrally formed as to form one first unit, and/or said second bevel gear wheel and its associated second gear wheel, related to said second prime mover or motor arrangement, to be integrally formed as to form a second unit and form the two units as identical corresponding units.

There resides a technical problem in being able to realize the importance of, the advantages associated with and/or the technical measures and considerations which will be required in order to cause that said first unit and said second unit to be, via its related freewheel bearing, pivotally supported by said shaft at a first pivotal direction and fixedly (coupled) or blockingly (uncoupled) supported by said shaft in an opposite second pivotal direction.

There resides a technical problem in being able to realize the importance of, the advantages associated with and/or the technical measures and considerations which will be required in order to cause said freewheel bearings to be arranged to pivotally support said shaft in different pivotal directions and are related to its allotted shaft section of said shaft, where said shaft sections are spaced a distance from each other along said shaft said distance corresponding to, or essentially corresponding to, the diameter of and the orientation of a third bevel gear wheel.

There resides a technical problem in being able to realize the importance of, the advantages associated with and/or the constructive measures which will be required in order to cause said first shaft to be adapted so as, with its diverging or from each other facing end portions, to extend through and beyond a housing enclosing the gear arrangements, the freewheel bearings and a set of gear wheels changing the direction of rotation, and that said first shaft may be drivable to said first direction of rotation by one or two prime mover or motor arrangements.

There resides a technical problem in being able to realize the importance of, the advantages associated with and/or the constructive measures which will be required in order to cause one or both prime movers or prime motor arrangements to be adapted to transfer to a first shaft a reciprocally directed translation movement.

There resides a technical problem in being able to realize the importance of the advantages associated with and/or the constructive measures which will be required in order to cause a first freewheel bearing to be related to the first rim gear arrangement and a second freewheel bearing to be related to the second rim gear arrangement and where these freewheel bearings are coordinated with said first shaft and mutually adapted for different driving rotational movements.

There resides a technical problem in being able to realize the importance of, the advantages associated with and/or the constructive measures which will be required in order to cause said third bevelled gear wheel, changing the direction of rotation of the first and the second bevel gear wheel, to be selected to be two, three or four in number and that each one of these gear wheels be journalled in its allotted shaft, a third shaft, oriented at right angle to said first shaft, and one or more of said third shafts may be allocated the function of a second shaft exposing one rotational direction in relation to the rotation of the shaft.

There resides a technical problem in being able to realize the importance of, the advantages associated with and/or the constructive measures which will be required in order to cause said first shaft, and one or more of said third shafts to be adapted to extend from a housing.

There resides a technical problem in being able to realize the importance of, the advantages associated with and/or the constructive measures which will be required in order to cause said prime movers or prime motor arrangements to consist of two mutually arranged pistons, each disposed in its allotted piston and cylinder assembly, by the intermediary of a piston rod arrangement and associated cylinders for the generation of a straight, linear and reciprocating, movement and where said the two prime movers or prime arrangements may be related as a "Boxer engine" arrangement.

In this instance, the present invention takes as its point of concept or departure the prior art technology, as disclosed by way of introduction and more clearly defined by the combination of features stated in the preamble of claim 1.

In order to be able to solve one or more of the above-disclosed technical problems, the present invention specifically discloses that the prior art technology is to be complemented by introducing the features and the combination of features now stated in the characterizing part of claim 1.

Proposed embodiments, falling within the scope of the fundamental concept of the present invention, are stated in each of the enclosed subclaims.

The advantages which may principally be deemed to be characteristic of the present invention and the specific significative characterizing features disclosed thereby is that there have hereby been created the preconditions for offering a transmission arrangement of a specific construction.

A first bevel gear wheel and first gear wheel or rim gear, which are components of a first prime motor arrangement, are integrally formed as to form one first unit, and a second bevel gear wheel and second gear wheel or rim gear, which are components of a second prime motor arrangement, are integrally formed as to form a second unit.

Said first unit and said second units are, via their related freewheel bearings, pivotally supported by one and the same common shaft at a first pivotal direction and fixedly or blockingly supported by said shaft at an opposite second pivotal direction.

Said freewheel bearings are arranged to pivotally support said hollow cylinder formed units with the shaft in different pivotal directions and are related to its shaft section of said shaft, where said shaft sections are spaced a distance from each other along said shaft corresponding to, or essentially corresponding to, the diameter of a third bevel gear wheel.

BRIEF DESCRIPTION OF DRAWINGS

One currently proposed embodiment, displaying the significative characterising features associated with the present invention will now be described in greater detail herein below, for purposes of exemplification with reference to the accompanying Drawings. In the accompanying Drawings.

DETAILED DESCRIPTION

By way of introduction, it should be emphasized that, in the subsequent description of a currently proposed embodiment displaying the significative cha-racterising features, associated with the present invention, and which are clarified in the figures within the accompanying drawings, we have selected terms and a specific terminology with a view thereby principally to clarify the inventive concept as herein disclosed.

However, in this context it should be kept in mind that the expressions selected here should not be seen as restrictive exclusively to the terms utilized and selected here but that it should be realized that every such selected term is to be interpreted so that, in addition, it encompasses all technical equivalents terms which function in the same or substantially the same manner within the scope of the present invention, as defined by the claims in order thereby to be able to attain the same or substantially the same object and/or technical effect.

With reference to the accompanying drawing figures, there are thus shown schematically and in detail the basic preconditions for the present invention and where the significative features associated with the present invention have been given concrete form as a result of the now proposed embodiment which will be described in greater detail herein below.

Figure 1:
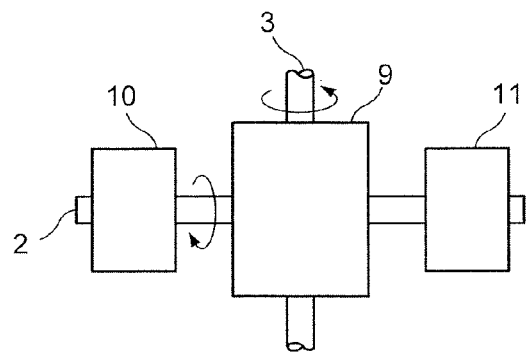
FIG. 1 illustrates a transmission arrangement, in accordance with the present invention, arranged in a covering housing, driven by a prime mover or prime motor arrangement shown to the left and/or a prime mover or prime motor arrangement shown to the right, where a driven first shaft is shown in a horizontal orientation, while an auxiliary shaft used (or driven) by the arrangement is shown in a vertical orientation.

Thus, FIG. 1 is a schematic view of a transmission arrangement with associated one or two external prime movers or motor arrangements 10, 11 intended for a driving sequence of a driven axle 2.

More specifically this FIG. 1 illustrates in principle a transmission arrangement, in accordance with the present invention, arranged within a covering housing 9, said arrangement is driven by one or two prime movers and/or prime motor arrangements, one 10 shown to the left and/or one 11 prime mover or prime motor arrangement shown to the right, whereby a driven first shaft 2 is shown in a horizontal orientation, while an auxiliary shaft 3, 13 is used (or driven) by the arrangement and shown in a vertical orientation.

Figure 2:
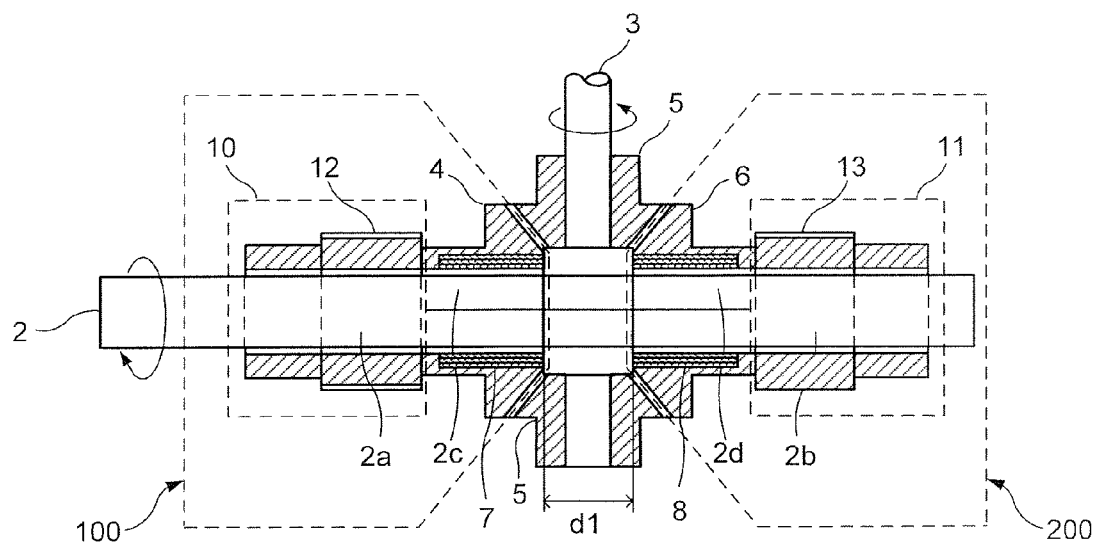
FIG. 2 is a sectional view of a transmission arrangement, in accordance with the present invention, related to a common axle but without an enclosing housing or casing.

FIG. 2 is a cross section of a transmission arrangement, in accordance with the present invention, but without a covering housing 9.

Figure 3:
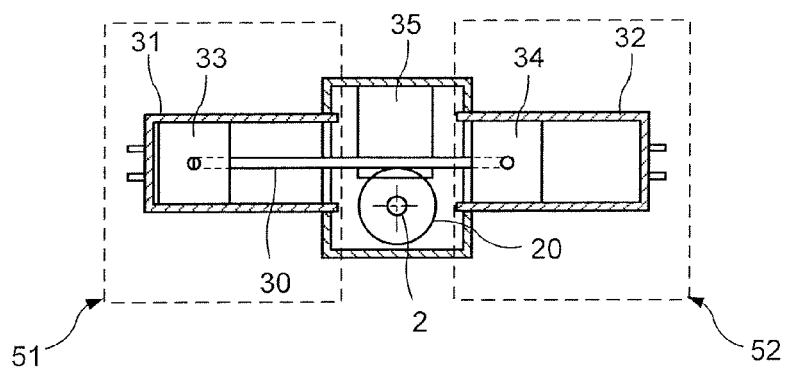
FIG. 3 shows a first embodiment of a prime mover for driving a common first shaft through a transmission arrangement and where the prime mover displays similarities with a "Boxer engine" arrangement.

Thus FIGS. 1, 2 and 3 in combination disclose the inventive transmission arrangement, here illustrated for translating a reciprocating translation movement, related to each of two gear rods 51, 52, in mesh with or in engagement with its allotted gear wheel or ram gear, where a first gear rod 51 and its associated first gear wheel 12' is representing here a part of a first prime motor arrangement 10, while a second gear rod 52 and its associated second gear wheel 13 is representing a part of a second prime motor arrangement 11 for causing a rotational movement of a shaft 2 in one and the same rotational direction, as will be described more in detail in the description hereinafter.

Said first gear wheel 12 and said second gear wheel 13' are hollow-cylindrical formed and concentrically arranged to said shaft 2 via their related freewheel bearing 7, 8, whereby a gear wheel arrangement 4, 5, 6 is including at least three bevel gear wheels.

Said arrangement is adapted to expose a first bevel gear wheel 4 in cooperation with said first gear wheel 12, a second bevel gear wheel 6 in cooperation with said second gear wheel 13 and an intermediate arranged third bevel gear wheel 5 adapted to mesh with or be in engagement with said first and second bevel wheels 4, 6, in order to adapt or to cause these two bevel gear wheels 4, 6 to rotate in different and opposing rotational directions.

The present invention is based upon the idea that said first bevel gear wheel 4 and its associated first gearwheel 12, related to said first prime motor arrangement 10, are integrally formed (not shown in FIG. 2) as to form one single hollow-cylindrical formed unit, hereinafter called a first unit 100.

Said second bevel gear wheel 6 and its associated second gear wheel 13', related to said second prime motor arrangement 11, are integrally formed (not show in FIG. 2) as to form one single hollow-cylinder formed unit, hereinafter called a second unit 200.

Said first unit 100 and said second unit 200 are more or less identically formed, and are via their related freewheel bearings 7, 8, pivotally supported by said shaft 2, at a first pivotal direction, and fixedly or blockingly supported by said shaft 2 in an opposite second pivotal direction, said freewheel bearings 7, 8 are arranged to pivotally support said shaft 2 in different pivotal directions and are related to its shaft section 2c, 2d of said shaft 2 where said shaft sections are spaced a distance "d1" from each other along said shaft 2 corresponding to, or essentially corresponding to, a "virtual" diameter of said third bevel gear wheel 5.

The arrangement may operate in the opposed direction of rotation or alternatively in a changed rotation sequence between an input pivotal movement and an output rotational movement.

A gear wheel arrangement, which is illustrated in greater detail in FIG. 2, consists of a number rim gears, in a rim gear arrangement, designated by three rim gears 4, 5 and 6, where these are disposed for transferring a reciprocating movement transferred to a pivotal or rotational movement of the axle 2 during the alternative use of said freewheel arrangements 7, 8.

Hence, FIGS. 1 and 2 illustrate that a first freewheel arrangement 7 related to said first motor arrangement 10 and a second freewheel arrangement 8 related to said second motor arrangement 11 could cooperate with its related shaft section 2c and 2d respectively and in coordinated manner impart to the shaft 2 its chosen direction of rotation.

The directions of rotations, respectively, may be selected to be clockwise or counter-clockwise, however if the prime mover 10 is selected for a first rotation direction, the prime mover 11 may be selected with an opposite rotation direction.

With reference to FIG. 2, it is there illustrated that said first direction of rotation is always allocated to said first shaft 2 where a rotational movement is transferable.

In an application where the gear rod 51 is moving towards the viewer in FIG. 2 the freewheel arrangement 7 is activated and the shaft 2 is driven. In an application where the gear rod 52 is moving away from the viewer in FIG. 2 the freewheel arrangement 8 is activated and the shaft 2 is driven.

In opposite direction of the movements for said rod gears 52 and 52 no rotational effect is transmitted.

FIG. 2 illustrates that the first freewheel bearing 7 and the second freewheel bearing 8 are to be coordinated with discrete and separate shaft sections 2c, 2d of one and the same shaft 2 and where the distance "d1" between these shaft sections along said shaft 2 is selected to correspond to a selected distance, for example the width of said third gear wheel 5.

Said first shaft 2 is adapted, with its diverging or end sections (facing from each other) 2a. 2b, to extend through and outside a housing 9 (not shown in FIG. 2) and that said shaft 2 is drivable to said first direction of rotation by one or two prime movers 10 and 11, respectively.

The bevel gear wheel 5 changing said direction of rotation has here been selected to be two, three or four in number and each one of these gear wheels is journalled by the intermediary of a third shaft 3, oriented at a right angle to said first shaft 2.

More particularly, the present invention discloses, according to FIG. 3, that said prime movers 10 or 11 may very well consist of two piston and cylinder assemblies 51 and 52, respectively, with two mutually fixedly pistons by the intermediary of a piston rod arrangement and associated cylinders for generating a straight, linear reciprocal movement and where the prime mover thus approaches a "Boxer engine" arrangement.

Figure 4:
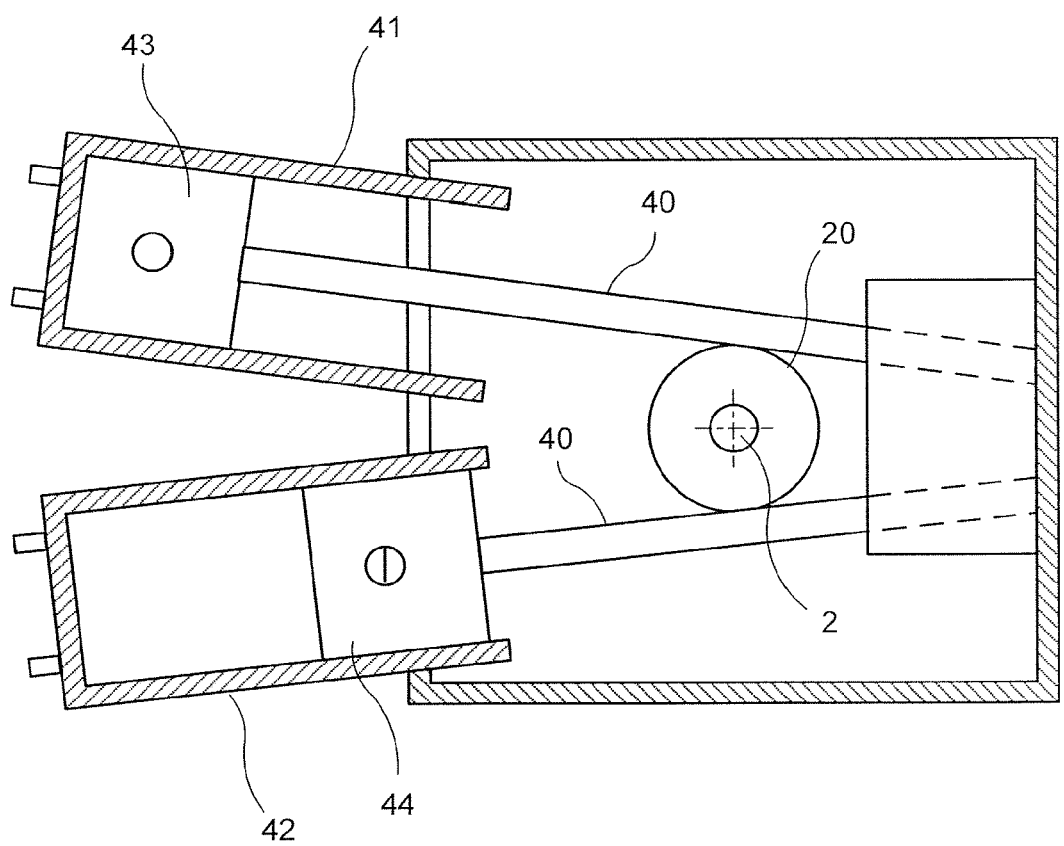
FIG. 4 shows an alternative arrangement of two prime mover units or arrangements where the piston and cylinder assemblies are disposed in "V" configuration and adapted to be able to drive the transmission arrangement, ac-cording to FIG. 1 or 2.

With reference to FIG. 4, said prime mover 10 or 11 may very well consist of two units, active for a rotation of said first shaft 2 in one and the same direction, where each unit consists of two or more fixedly united pistons, by the intermediary of a fixed piston rod arrangement and associated cylinders for generating a straight, linear reciprocal movement.

Said fixed piston rod arrangement, in both FIG. 3 and FIG. 4, display a gear rod arrangement acting directly or indirectly on said first shaft 2.

The straight linear mechanical piston rod 30 which connects the two pistons 33, 34 within the drive cylinders consists of steel or suitable material which can withstand the demands on wear/heat, which occur in operational conditions.

The cylinders 31, 32 are straight in line with one another and the two pistons 33, 34 are interconnected to one and the same piston rod 30 by the intermediary of single piston bolt, i.e. a rigid inter adjacent rod.

The design may undergo numerous variations relating to the following assembly functions:
  A. Straight piston rod 30 relating to linear counter directed cylinders 31, 32 (shown in FIG. 3).
  B. Two piston rods 40, relating to angled piston and cylinder assembly, so-called "V" configuration, where this form is adapted to reduce the longitudinal dimensions of the construction (shown in FIG. 4).

A straight piston rod 30 gives a "Boxer engine" arrangement while angled piston rods 40 give a "V-shaped" engine arrangement.

According to FIG. 3, the piston rod 30 will be of a "gear rack" or gear rod type, apart from the coupling section of the piston, approx. 100 mm, where the residual part is the active toothed section 30a of the rod 30, which abuts against a centrally positioned shaft 2 with a drive wheel or a gear wheel 20 mounted in the "central unit" of the engine, where the converter is mounted with its through-going rotational shaft 2 which, in its outer ends 2a, 2b outside the housing 9 is connected to one or two flywheels (not shown).

The piston rod 30 ("the gear rack") can be of two types, round with milled teeth or square or other configuration where the teeth are milled on one planar side of the rod.

The round or cylindrical rod is then intended for a guiding, journaling of the linear movement as well as for an adjustable abutment against the gear wheel 20 on assembly. For other gear rods, the abutment function is adapted to fit the configurat-ion of the rod.

The guiding of the piston rod 30 takes place with an adjustment 35 to a linear direction between the pistons relating to the "Boxer engine" arrangement and on mounting of the engine function, according to the "V-engine" type or other mounting, this implies that the abutment surface (active transmission section) of the piston rod 40 must, from the point of view of operations, be mounted on the opposing side of the driving gear wheel 20 in order to obtain a 360° rotational function.

The possibility of milling teeth on the opposite side of the gear rod 30 for obtaining a double function of the rotary movement should also be considered.

The possibility of causing the same engine body with the same piston movement to obtain different rotational forces and rotational speeds of the same linear movement from the pistons should be considered, e.g. driving of a generator and pumps for the engine's own functions.

Today's modern automotive engines make use of rapid and high rotation for the simple reason that low rpm does not give the force required.

The pivotal mass "M" gives, at higher speeds of rotation, the possibility of extracting the requisite driving force with great assistance from the functions of the gearbox.

In a four-stroke, four cylinder engine, each cylinder function emits approx. 25% of driving force per 360° rotation, this in series with the others, in other words fuel must be pumped in four times, as well as the valve function also controls the exhaust gases four times per revolution in order for the engine shaft to rotate one revolution. Moreover, this single operating cylinder func-tion must give tractive force to the entire load.

The present invention can operate according to a new model for transfer of the piston movement to a torque on the engine shaft.

Today's automotive techniques (Otto and Diesel engines) operate so that the crankshaft is connected to the piston rod, which implies, when the work stroke is completed after approx. 25% of the revolution/piston movement, that the piston returns to its starting position by the other pistons' function. Hence, one of the pistons must always alone account for the whole of the engine work, since these operate in series with one stroke at a time.

The present invention can be based on the feature that no crankshaft function is required, instead two pistons operate in harness with a piston rod 30 between the pistons 33, 34, either in a "Boxer function" or alternatively in a "V"-engine" connected function with two piston rods 40 which transfer the linear movement to a gear wheel 20 mounted on the live shaft 2.

The function will be such that when piston 33 is activated, for example by explosion of fuel pressure, this is moved from an upper position (illustrated in FIG. 3) to a lower position in the cylinder 31, while the corresponding cylinder 34 is urged from a lower position (shown in FIG. 3) to an upper position (not shown), while the exhaust gases generated in the previous instant depart from the cylinder 32.

This operational method makes for a reciprocally directed movement occur-ring via the piston rod, which is a gear rod 30 which is mounted together with a gear wheel 20 which transfers this movement continuously to the rotational converter, which is mounted on the live shaft 2.

There, a conversion takes place from a linear movement direct to a 360° rotation of the live shaft, even if the piston rod executes a reciprocal movement.

The recuperating or returning function is obtained when the piston and cylinder assembly 52 is operative, i.e. executes work in the same manner as the piston and cylinder assembly 51 earlier in the sequence.

A compression relationship occurs when the exhaust gases are to be forced out of the cylinder. This position when an exhaust valve (not shown) is to be opened is determined by the valve timing. By such means, two positive functions are attained.

The retardation of the piston stroke from the working cylinder can be controlled, this combined with the fact that the fuel for the next sequence (working stroke) can also be adapted into the timing of the valve system.

Consequently, the engine will operate in two stroke mode. Each cylinder has two valves, a fuel valve and an exhaust valve.

It will be apparent from the foregoing description that an engine with two cylinders produces a 360° revolution, against today's four cylinders, which me-ans half of the fuel consumption per unit of time.

Today's automotive technology has low torque at low engine speeds, for which reason the engine speed must be high so that the pivotal mass "M" which the engine has at high speeds assists in a decisive way in operation.

After the engine, a gearbox, is coupled in the train whose purpose is to reduce the engine speed and increase the torque and also adapt the output engine speed to the wheels against the road surface in a vehicle.

The engine operates at a low speed, approx. 10% of today's engines, but as a result of the new technology, the torque will be high and will also be better adapted to its working duties, in the event of a need for higher speed on the output shaft to a wheel, a gear with two or three stages is coupled in.

For example, for a heavy lorry at 100 kph, the drive wheel rotates at approx. 500 rpm, for which reason no higher speed is required from the prime mover, which gives a considerably improved fuel economy.

This implies that the engine does not consume the fuel in the same way as today's four stroke engines, but only a two stroke with two cylinders.

It should be observed that this new working stroke is not the same as today's two stroke engines. These have proved to have a poorer fuel economy and operate in a different manner.

The prime mover has two valves on each cylinder which, via a valve guide, controls the fuel supply and the exhaust gas emission. There is also the possibility of utilising direct injection of the fuel, as is the case in modern engines today.

The relationship between the piston rod and the driving gearwheel 20, i.e. the diameter of the gearwheel, determines the torque as well as the size of the speed of revolution of the engine.

If the drive gearwheel 20 is selected to have a radius of 100 mm, this entails that the input piston force from the cylinder via the piston to the gear rod increases the torque ten times (power from piston—100 kg; power to live shaft 1000 kp).

For example in a stroke length of 100 mm, the gearwheel rotates through 180° of the one side of the piston and cylinder assembly, the other side of the piston and cylinder assembly similarly 100 mm and 180° in the other direction, and then the live shaft has rotated through 360°. If the piston speed is selected at 4 times/sec, the live shaft will rotate at 240 rpm.

This applies to the utilisation of two piston and cylinder assemblies, according to FIG. 3 (a Boxer arrangement) and if these two prime movers operate on the same live shaft, the following possibilities may be obtained.

Four working piston and cylinder assemblies naturally give twice the engine power, but an interesting engine alternative will be if the second piston and cylinder assembly obtains the exhaust gas pressure from the first piston and cylinder assembly, since the accumulated pressure will then be utilised once more for work.

In a phase prior to departing from the first piston and cylinder assembly, this pressure has been compressed at the same time as a retardation has taken place of the active piston inside the first piston and cylinder assembly, and so on. There will thus be obtained to vital functions during the working cycle and this at no extra fuel supply in the engine.

The technology is to be considered, on the one hand, as increasing power and, on the other hand, offering an additional fuel saving and moreover in a totally new technical field.

FIG. 3 has a function as follows:

A 1. The first piston and cylinder assembly 51, driven by explosion technology, first rotates the live shaft through 360°, while the second piston and cylinder assembly 52 is driven by the exhaust gas pressure (thermodynamics).

B 1. The exhaust gases from the first piston and cylinder assembly 51 are led to the second piston and cylinder assembly 52 (counter-dir-ected working stroke) on exhaust, and also the second piston and cylinder assembly 52 leads the exhaust gases to a third piston and cylinder assembly (not shown).

According to FIGS. 5A-5D, there will be obtained in this working method additional torque from piston to cylinder assemblies 53 and 54 as a result of the compression obtained when the exhaust gases are forced out from the work of the previously active assembly. This implies that a higher engine output will be obtained without additional fuel being supplied to the engine.

As a result of the compression, which is obtained when the exhaust gases are compressed by the work of the counter-directed assembly, and also when the exhaust valve opens, a compressed gas volume will be transferred to the assemblies 53 and 54, which execute all parallel work according to the sequence assembly 51 working; assembly 52 driven by exhaust gas pres-sure; assembly 52 working, assembly 53 driven by exhaust gas pressure.

The "compression stroke" has two functions during the work of the assembly:

A 1. To retard the movement of the working piston until the exhaust valve opens.

B 2. To compress the exhaust gases prior to emission and raise the exhaust gas pressure.

With the valve timings, the work of the prime mover is adjusted when fuel is added and also the exhaust gases are to be evacuated from the prime mover.

The driving gear wheel 20 may be integrated with the rim gear 4, 6 of the rotation converter which are mounted axially in relation to the gearwheel 5, which turns the rotational movement to the rim 6 of the other side, which similarly has its driving gearwheel mounted.

Since the gear rods (or piston rods) may drive the gear wheels 4, 6 in differ-rent directions of rotation, and since a locked bearings or journals 7, 8 are mounted on each side of the rim gear 5, (the bearings are mounted counter-directed to one another) an engagement will be obtained via the bearings 7, 8 against the shaft 2 in such a manner that the assemblies 51 and 54 may turn the live shaft 2 clockwise at the same time as the assemblies 52 and 53 are disengaged. In a next sequence, the assemblies 52 and 53 work and the assemblies 51 and 54 are disengaged.

By such means, a 360° rotation of the live shaft 2 will be obtained.

By employing an arrangement according to FIG. 3 as well as a converter or arrangement according to the foregoing, the same 360° rotation will be obtained, but with half of the torque.

The rotation converter or arrangement utilizes and turns the linear direction of the assemblies 53 and 54 and towards the assemblies 51 and 52 and this is positive for the balance of the engine and reduces vibration during working sequences.

When the working assembly 51 moves, by the explosive force, towards its lower turning point, the assembly 52 moves from its lower turning point towards its upper turning point.

The assembly 52 compresses the enclosed gas volume during its movement towards the upper turning point. This movement takes place with the exhaust valve closed, which implies that a compression together with a retardation of the movement of the assembly 52 take place. This will be a natural sequen-ce, since the pistons 33, 34 are mounted one and the same piston rod 30.

When approx. 20-30% of the movement remains to the upper turning point, the exhaust valve opens where the sequence is later adjustable and repeats the working cycle or sequence, and so on.

Two functions of the exhaust gases are made possible:

A3. The exhaust gases are received direct from the assembly to a used silencer.

B3. The exhaust gases are received by the assembly 52 as a driving gas if such a function is mounted, which increases the engine output, calculated at approx. 80-90%.

The valves may be operated according to:

A4. With adjustable sequences controlled by a used camshaft.

B4. With hydraulic valves or pneumatic valves where these are operated by electronic pulse emitters and may be adjustable.

Upper and lower turning points for the movement of the assemblies are determined by the activation of the valves.

Important functions are included in the basic construction, which differ from today's engines.

A5. In tandem mounting (of the assemblies 51 and 52 according to FIG. 3), these assembly pairs work individually in such a manner that the driving of the live shaft 2 takes place independently of one another from the point of view of engagement with the live shaft 2, which entails major advantages.

B5. If the one engine pair 10 ceases to drive the live shaft 2, i.e. this engine pair or arrangement 10 has a lower speed of revolution, this implies that the engine will continue to turn over with the operative engine pair or arrangement 11 however at half of the torque.

C5. The transmission arrangement has the freewheel function 7, 8 when the rotation of a prime movers or prime motor arrangements 10, 11 have a lower speed than the live shaft 2, for example downhill or in braking or alternatively when the accelerator is not activated.

(There is no gear braking obtainable, for which reason braking of the vehicle must take place in the usual way; either using a universal brake or a foot brake.)

D5. The novel function in engine context entails that a considerably more reliable engine function is obtained in this manner, suitably as regards sensitive engine functions, for example helicopters, propeller-driven aircraft and operation of electric transformer assemblies and the like. which have a sensitive function in the society and which entail inconveniences in the event of an engine failure in today's engines. (This does not apply when only one assembly 51 or 52 is mounted.)

"Four cylinder Otto-Diesel engines".

Four working strokes, four fuel inputs for producing one revolution of 360°.

High motor revolution speeds to obtain sufficient power because of the positive action of the pivotal mass. Must reduce the engine speed using the gearbox to the speed of rotation of the drive wheels.

"Engine with two "Boxer-engine" connected assemblies".

Two working strokes, two fuel inputs create one revolution of 360°.

Low engine speed, better adaptation of engine speed and torque to the drive wheels.

A few gear changing steps because of large torque and as a result good drawing power.

When the motor speed of the assembly 51 or 52, respectively, falls below the speed of rotation of the output shaft 2, the prime mover or prime motor arrangement 10 or 11 is disconnected from the load automatically through the related freewheel function 7, 8. The engine can be adapted to different propellant fuels by replacement of the cylinder head, petrol (gasoline), diesel, bio fuel, gas, steam as well as also a closed gas operation system.

This novel type of rotation converter or arrangement drives the shaft 2 at least 180° during each piston stroke, adjustable in that the stroke length of the piston and the diameter of the drive rim gear or gear wheel determine the rotation of the live shaft 2 per piston stroke.

This novel rotation converter or arrangement 1 has an operational position from both sides via the driving gear wheels 4, 6, which makes possible double operational profile and both equal as different rotation speed as well as the same as well as different torques.

FIGS. 5A-5D shows four different alternatives of coupled-in assemblies 52 to 54.

Figure 5:
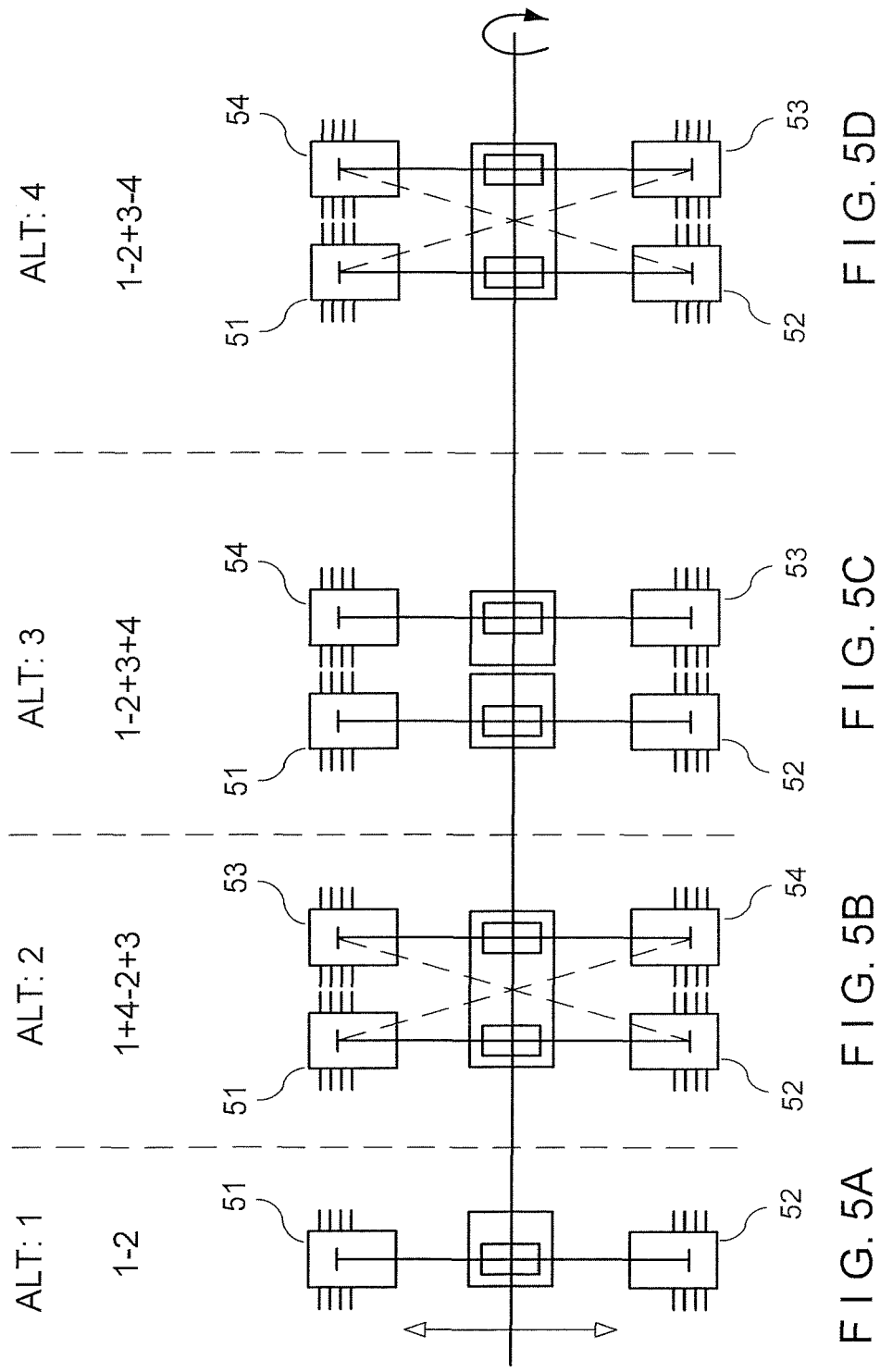
FIGS. 5A-5D are a simplified overview of a number of prime movers or arrangements coordinated as piston and cylinder assemblies for driving a transmission arrangement.

FIG. 5A utilizes a working stroke for the assemblies 51 and 52.

FIG. 5B utilizes a tandem operation of 51 and 54 as well as 52 and 53.

FIG. 5C utilizes a single operation of 51 and 52; and 53 and 54, respectively.

FIG. 5D utilizes a double power;

51 is driving while 52 gives exhaust gas pressure to 53;

52 is driving while 51 gives exhaust gas pressure to 54.

For 53 and 54, the exhaust gases are released.

Figure 6:
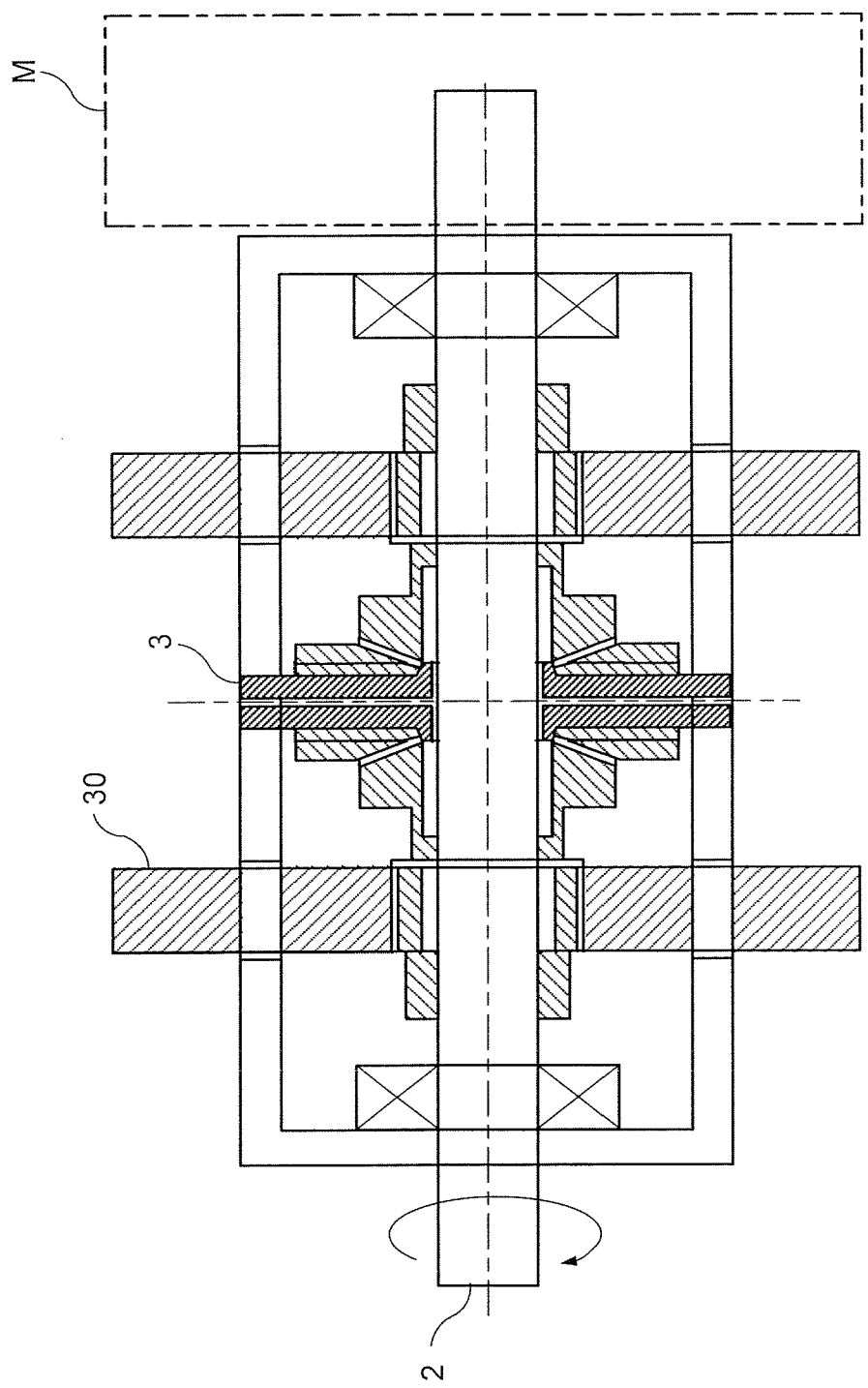
FIG. 6 shows an alternative to the embodiment according to FIG. 3 and in an application illustrated in FIGS. 5A-5D.

FIG. 6 relates to a supplementation of the embodiment according to FIG. 3 in an application according to FIGS. 5A-5D and alternatives 5B-5D with an adapted flywheel "M".

Naturally, the present invention is not restricted to the embodiment disclosed by way of example above, but may undergo modifications without departing from the scope of the inventive concept as disclosed in the Claims.

In particular, it should be observed that each illustrated unit and/or circuit may be combined with every other illustrated unit and/or circuit without departing from the scope of the invention, as defined by the appended claims in order to be able to attain the desired technical function.

The invention claimed is:

1. A transmission arrangement for translating movement of a plurality of prime motors into a rotational movement for rotating a shaft in a rotational direction, the transmission arrangement comprising:

(a) a first prime motor arrangement comprising a first prime motor, a first gear wheel, a first bevel gear wheel and a first freewheel bearing, the first gear wheel being engaged with the first prime motor and being integrally formed with the first bevel gear wheel to form a first unit, the first unit being concentrically attached to the shaft via the first freewheel bearing with the first freewheel bearing engaging the shaft only when the first gear wheel rotates in the rotational direction such that the first gear wheel can translate a movement of the first prime motor into a rotational movement of the shaft if the first gear wheel is rotating in the rotational direction but not if the first gear wheel is rotating in a direction opposite to the rotational direction;

(b) a second prime motor arrangement comprising a second prime motor, a second gear wheel, a second bevel gear wheel and a second freewheel bearing, the second gear wheel being engaged with the second prime motor and being integrally formed with the second bevel gear wheel to form a second unit, the second unit being concentrically attached to the shaft via the second freewheel bearing with the second freewheel bearing engaging the shaft only when the second gear wheel rotates in the rotational direction such that the second gear wheel can translate a movement of the second prime motor into a rotational movement of the shaft if the second gear wheel is rotating in the rotational direction but not if the second gear wheel is rotating in a direction opposite to the rotational direction; and (c) means for engaging the respective first and second bevel gear wheels to cause the second unit comprising the second bevel gear wheel and second gear wheel to rotate in a direction opposite to the rotational direction when the first gear wheel is rotating in the rotational direction and to cause the first unit comprising the first bevel gear wheel and first gear wheel to rotate in a direction opposite to the rotational direction when the second gear wheel is rotating in the rotational direction.

2. The transmission arrangement according to claim 1, wherein the transmission arrangement is for translating a reciprocating movement and each of the plurality of prime motors comprises a gear rod.

3. The transmission arrangement according to claim 1, wherein the means for engaging comprises at least a third bevel gear wheel disposed along the shaft between the first bevel gear wheel and the second bevel gear wheel, the first and second freewheel bearings engaging the shaft at respective first and second sections of the shaft, said first and second sections being separated by a distance corresponding essentially to a diameter of the third bevel gear wheel.

4. The transmission arrangement according to claim 1, further comprising a housing, the shaft comprising first and second free ends that extend through and outside of the housing.

5. The transmission arrangement according to claim 1, wherein the means for engaging comprises a plurality of bevel gear wheels each of which is journaled to the shaft and oriented at a right angle relative thereto.

6. The transmission arrangement according to claim 1, wherein each of the first and second prime motor arrangements comprises piston means for generating a straight, linear reciprocal movement for driving the first and second gear wheels.

7. The transmission arrangement according to claim 6, wherein the piston means comprises a plurality of mutually fixedly united pistons, a fixed piston rod arrangement and an associated cylinder arrangement that cooperate to generate the straight, linear reciprocal movement for driving the first and second gear wheels.

8. The transmission arrangement according to claim 7, wherein the fixed piston rod arrangement comprises a gear arrangement that acts directly or indirectly on said shaft.

* * * * *